(12) United States Patent
Vartdal

(10) Patent No.: US 10,843,202 B2
(45) Date of Patent: Nov. 24, 2020

(54) APPARATUS AND A METHOD FOR RECYCLING OF STRUCTURAL MATERIALS

(71) Applicant: Vartdal Plastindustri AS, Vartdahl (NO)

(72) Inventor: Håvard Vartdal, Vartdal (NO)

(73) Assignee: Vartdal Plastindustri AS, Vartdal (NO)

(*) Notice: Subject to any disclaimer, the term of this patent is extended or adjusted under 35 U.S.C. 154(b) by 286 days.

(21) Appl. No.: 15/772,428

(22) PCT Filed: Oct. 27, 2016

(86) PCT No.: PCT/NO2016/050215
§ 371 (c)(1),
(2) Date: Apr. 30, 2018

(87) PCT Pub. No.: WO2017/078538
PCT Pub. Date: May 11, 2017

(65) Prior Publication Data
US 2018/0319043 A1 Nov. 8, 2018

(30) Foreign Application Priority Data

Nov. 3, 2015 (NO) .................................. 20151486

(51) Int. Cl.
*B02C 19/06* (2006.01)
*B29B 17/02* (2006.01)
(Continued)

(52) U.S. Cl.
CPC .......... *B02C 19/06* (2013.01); *B02C 19/0043* (2013.01); *B02C 19/061* (2013.01);
(Continued)

(58) Field of Classification Search
CPC . B29B 17/02; B29B 17/0412; B02C 19/0043; B02C 19/06–068; B02C 23/18;
(Continued)

(56) References Cited

U.S. PATENT DOCUMENTS 2,132,708 A * 10/1938 Smith ..................... A23L 3/266
43/142
4,813,614 A * 3/1989 Moore .................... B02C 19/18
241/101.71
(Continued)

FOREIGN PATENT DOCUMENTS

CH 700480 * 2/2009 ............. B29B 17/02
CN 101224609 7/2008
(Continued)

OTHER PUBLICATIONS

Norwegian Search Report, Norwegian Patent Application No. 20151486, dated Apr. 18, 2016.
(Continued)

*Primary Examiner* — Shelley M Self
*Assistant Examiner* — Smith Oberto Bapthelus
(74) *Attorney, Agent, or Firm* — Andrus Intellectual Property Law, LLP

(57) ABSTRACT

An apparatus and a method are for separating a plastic-based insulation material from a concrete-based constructional element, to which the insulation material is attached. The apparatus has at least one fluid-jetting device which is in fluid communication with a pressure-generating device to produce a fluid jet with a pressure sufficient to release the insulation material from the constructional element. The apparatus is configured to allow relative motion between the fluid-jetting device and the constructional element.

9 Claims, 5 Drawing Sheets

(51) Int. Cl.
  *B02C 19/00* (2006.01)
  *B29B 17/04* (2006.01)
  *B29K 25/00* (2006.01)
  *B29K 75/00* (2006.01)
  *B29K 105/04* (2006.01)
  *B29L 31/10* (2006.01)

(52) U.S. Cl.
  CPC .......... *B02C 19/063* (2013.01); *B02C 19/065* (2013.01); *B02C 19/066* (2013.01); *B29B 17/02* (2013.01); *B29B 17/0412* (2013.01); *B29B 2017/0428* (2013.01); *B29B 2017/0432* (2013.01); *B29K 2025/06* (2013.01); *B29K 2075/00* (2013.01); *B29K 2105/04* (2013.01); *B29L 2031/10* (2013.01); *Y02W 30/62* (2015.05)

(58) Field of Classification Search
  CPC ........ B02C 23/08; B60S 3/04; Y02W 30/622; Y02W 30/625; B29K 2025/06; B29K 2075/00; B29K 2105/04; B29K 2031/10; B24C 3/08; B24C 3/085; B24C 3/12; B24C 3/18
  USPC .................................. 241/14; 451/38, 39, 89
  See application file for complete search history.

(56) References Cited

U.S. PATENT DOCUMENTS

| | | | | |
|---|---|---|---|---|
| 5,115,983 | A * | 5/1992 | Rutherford, Sr. | ........ B02C 19/06 241/1 |
| 5,534,077 | A * | 7/1996 | Lichtblau | .............. B09B 3/0058 134/175 |
| 5,794,861 | A * | 8/1998 | Rutherford, Sr. | ........ B29B 17/02 241/1 |
| 6,527,208 | B1 * | 3/2003 | Callahan | ................. B29B 17/02 241/24.11 |
| 2002/0002208 | A1 * | 1/2002 | Martel | ...................... B02C 4/04 521/45.5 |
| 2003/0070754 | A1 * | 4/2003 | Francis | ................... B03B 9/061 156/709 |
| 2005/0066785 | A1 * | 3/2005 | Kissell | ...................... B26F 1/26 83/177 |
| 2008/0020206 | A1 * | 1/2008 | Fay | ......................... E04B 1/7604 428/375 |
| 2013/0239992 | A1 * | 9/2013 | Detrick | ............... F15B 15/2876 134/18 |
| 2018/0319043 | A1 * | 11/2018 | Vartdal | ............... B02C 19/0043 |

FOREIGN PATENT DOCUMENTS

| | | | |
|---|---|---|---|
| CN | 103660074 | | 3/2014 |
| CN | 101885558 | | 11/2017 |
| JP | 03156068 | * | 7/1991 |
| JP | H03156068 | | 7/1991 |
| JP | H0966245 | | 3/1997 |
| JP | H09170336 | | 6/1997 |
| JP | 2007291747 | | 11/2007 |
| JP | 2008194565 | | 8/2008 |
| JP | 2010222786 | | 10/2010 |
| JP | 5276209 | * | 8/2013 ............ B29B 17/02 |
| JP | 2014025331 | | 2/2014 |
| KR | 20070000615 | | 1/2007 |
| KR | 100756420 | | 9/2007 |
| KR | 20110102280 | | 9/2011 |
| NL | 1017770 | | 10/2002 |

OTHER PUBLICATIONS

International Search Report, PCT/NO2016/050215, dated Jan. 5, 2017.
Written Opinion and Reply, PCT/NO2016/050215, dated Jan. 5, 2017.
Written Opinion and Reply, PCT/NO2016/050215, dated Oct. 10, 2017.
International Preliminary Report on Patentability, PCT/NO2016/050215, dated Jan. 15, 2018.
Extended European Search Report for EP 16862529.1, dated May 28, 2019.

* cited by examiner

APPARATUS AND A METHOD FOR RECYCLING OF STRUCTURAL MATERIALS

CROSS-REFERENCE TO RELATED APPLICATIONS

This application is the U.S. national stage application of International Application PCT/NO2016/050215, filed Oct. 27, 2016, which international application was published on May 11, 2017, as International Publication WO 2017/078538 in the English language. The International Application claims priority of Norwegian Patent Application No. 20151486, filed Nov. 3, 2015. The international application and Norwegian application are both incorporated herein by reference, in entirety.

FIELD

The present invention relates to an apparatus and a method for use in connection with the recycling of structural materials. It relates more particularly to an apparatus and a method for separating an insulation material from a constructional element to which the insulation material is attached.

By an insulation material is meant, in this connection, a thermally insulating material for reducing heat exchange between two side faces in a building structure, in which one of the side faces is typically exposed to the outside environment of the building, and the other one of the side faces is exposed to the interior of the building.

The constructional element to which the insulation material is attached may, for example, be made of platelike elements of concrete or other stone- or mineral-based constructional elements. For the sake of simplicity, such elements will be referred to, in what follows, as concrete-based constructional elements.

BACKGROUND

A person skilled in the art will know that insulated constructional elements of the kind described above are, to a large extent, made as a sandwich structure in which the insulation material is embedded between external and internal constructional elements of concrete or fixed to constructional elements of some other nature. Further, it will be known that, in such a sandwich structure, an insulation material may typically be a thermoplastic like EPS (expanded polystyrene) or XPS (extruded polystyrene). Further, it will be known that a thermosetting plastic like polyurethane foam could be used as well. A typical field of application of polyurethane foam in a constructional element of the kind in question here may be as insulation in building blocks.

Buildings constructed by means of insulated concrete elements, referred to as sandwich elements in the trade, have been in use for several decades. A number of the buildings no longer satisfy today's requirements for standard with respect to insulation, universal accessibility, integration of electrical installations and installations for heating, water and sanitation, and must therefore either go through very extensive and consequently very expensive renovation, or be removed. In some cases it is economically and practically beneficial to demolish at least parts of the buildings.

If the different components of the sandwich elements are not separated, the elements will have to be taken to a depositing site. Such disposal is both expensive and not very environmentally friendly. Expensive because of transport to the disposal site and costs relating to the disposal itself, and not very environmentally friendly because of at least some of the different components of the elements involving a recoverable resource which will not be utilized on disposal. For example, all the components of a constructional element consisting of concrete, reinforcement and an insulation material based on a thermoplastic may be recovered or at least find a field of application more useful than disposal. The concrete itself may typically be crushed and used as fill material in the ground, whereas the insulation material and reinforcement may be recycled. By using crushed concrete as fill material in situ, the need for having other fill material brought in may be reduced, while, at the same time, transport of the concrete away from the building site may be avoided or reduced in extent.

From the publication KR20070000615A, an apparatus and a method for separating a light-weight material, such as vinyl, wooden materials, EPS and fibres, from concrete products are known. The apparatus and the method include crushing the concrete with the associated light-weight material and then introducing the crushed materials into a washing and separation process. However, a method like that may result in a light-weight material, such as EPS insulation material, still attaching to fragments of the concrete after the crushing and separation process.

From the publication KR100756420B, an apparatus and a method for separating different components of a crushed structural material are known. The apparatus includes a cyclone separator. The apparatus and the method are encumbered with the same drawbacks as the apparatus and method according to KR20070000615A.

From the publication CN101885558A, a method for recycling water containing expanded polystyrene is known.

From the publication KR 20110102280A, an apparatus and a method for crushing and grinding a structural material and then separating the different components of the structural material are known. The apparatus and the method according to KR20110102280A are encumbered with the same drawbacks as those appearing from the publications KR20070000615A and KR100756420B.

From the publication JP 5276209 B1 an apparatus for removing an insulating layer of polyurethane that has been applied to a surface such as a wall, a door and a roof of a building, is known. The insulating layer is removed by applying a high-pressure water jet against the surface. The water jet has a conical shape obtained by means of a rotating nozzle.

SUMMARY

The invention has for its object to remedy or reduce at least one of the drawbacks of the prior art or at least provide a useful alternative to the prior art.

The object is achieved through features which are specified in the description below and in the claims that follow.

In a first aspect of the present invention, there is provided an apparatus for separating a plastic-based insulation material from a concrete-based constructional element to which the insulation material is attached. The apparatus comprises at least one fluid-jetting device which is in fluid communication with a pressure-generating device for the generation of a fluid jet having a pressure sufficient to release the insulation material from the constructional element, and that the apparatus is configured to allow relative motion between the fluid-jetting device and the constructional element. The characteristic features of the apparatus are that the apparatus comprises a chamber arranged to enclose a portion of the constructional element at least partially, and that a jetting direction of the fluid-jetting device is directed inwards in the chamber.

The insulation material may comprise a thermoplastic like EPS (expanded polystyrene) or XPS (extruded polystyrene), or a thermosetting plastic such as polyurethane foam.

By releasing the insulation material from the concrete-based constructional element before this is carried out of the apparatus, it may be ensured that the constructional element has been substantially cleaned of insulation material before a possible subsequent crushing of the constructional element is started. The effect of this is that practically all of the insulation material based on a thermoplastic like EPS or XPS and all of the concrete may be recovered. For the time being, an insulation material based on thermosetting plastic will have to be taken to a depositing site, the applicant not having any knowledge of this being recyclable.

In a subsequent crushing of concrete-based constructional elements cleaned of insulation material, reinforcement, if any, in the concrete may also be sorted out, for example by means of a magnet. It should be emphasized that the crushing of the concrete and a possible sorting-out of the reinforcement are carried out by means of apparatuses known per se, and are not part of the present invention.

The at least one fluid jet that is directed against the insulation material may result in this being broken down into small particles. Because of the low specific weight of the insulation material, these small particles may easily become spread into the environment around the apparatus. To prevent or at least reduce such spreading, the apparatus comprises a chamber arranged to at least partially enclose a portion of the constructional element, wherein a jetting direction of the fluid-jetting device is directed inwards in the chamber. By the term inwards is meant from a periphery of the chamber and in towards a center portion of the chamber. Such a chamber will also reduce the risk of personnel present in the vicinity of the apparatus being hit by the fluid jet(s) or particles released from the insulation material, possibly from the constructional element.

A person skilled in the art will know that a constructional element of the kind in question here may have a considerable size in its position of application in a building. By considerable is meant, in this connection, a length of typically 6-10 meters, and a height typically in the order of up to 3.5 meters. Larger constructional elements are less common for, among other things, reasons of transport related to the transport of the constructional elements from the production site to the building site.

As will be understood from the description below, the length of the constructional element may be of no importance to the apparatus, as the apparatus is configured to allow relative motion between the fluid-jetting device and the constructional element.

However, the height of the constructional element will be of importance for the design of the apparatus. This is because a possible chamber arranged to enclose a portion of the constructional element would then have to be dimensioned for the highest constructional elements. Alternatively, such a chamber could be formed to be adjustable, which would complicate the apparatus somewhat, and is thereby not the most preferred solution. Further, a very high constructional element, for example 3.5 meters high, would require a very high fluid pressure to be able to cut through the insulation material in the constructional element. The pressure might be reduced somewhat by providing the apparatus with two or more jetting devices, at least two of which have substantially mutually opposite jetting directions, so that fluid jets will act on the insulation material from two opposite sides. Alternatively, the constructional element could go through a two-step cleaning process, in which the constructional element is first subjected to a fluid jet from a first edge face, in order then to be turned 180° around its longitudinal axis before the constructional element is subjected to a fluid jet from a second edge face which faces in the opposite direction to the first edge face. However, this would complicate the process and is thus less desirable.

To reduce the above-mentioned challenge related to the height of the constructional element, it may be an advantage to divide the element into segments with heights adapted for the apparatus. A prototype of the apparatus is adapted for constructional elements with a height of about 1.2 meters, which means that a constructional element with a height of 3.5 meters will have to be divided into three parts. As mentioned above, the length of the constructional element is of no importance for the function of the apparatus. It should be emphasized that the apparatus according to the present invention may be used for constructional elements that are smaller than the dimensions mentioned.

To be able to carry the constructional element while the fluid jet is being directed against the insulation material, the apparatus may comprise a supporting structure.

In its very simplest form, the supporting structure may be a base carrying both the constructional element and the apparatus comprising the fluid-jetting device, the apparatus being movably arranged on the base.

In one embodiment, the supporting structure comprises a conveyor which provides for relative motion between the fluid-jetting device and the constructional element. The conveyor may be a roller conveyor to allow a movement of the constructional element past the at least one jetting device which may then be stationary. Alternatively, or additionally, the conveyor may be a carrier means that allows a movement of the at least one jetting device along a longitudinal axis of the constructional element. In one embodiment, such a carrier means may be a sliding arrangement or an arrangement with a similar function, which is connected to the at least one jetting device. In those cases in which the apparatus comprises said chamber arranged to at least partially enclose a portion of the constructional element, the carrier means may be arranged for the chamber so that the chamber can be moved relative to the supporting structure in the form of said roller conveyor, for example.

Independently of whether the constructional element is moved relative to the chamber, whether the chamber is moved relative to the supporting structure or whether both the constructional element and the chamber are set into motion when the apparatus is being used, the apparatus may be provided with one or more driving means to bring about the movement(s). For example, a supporting structure of the roller-conveyor type may be provided with at least one, but preferably several driving rollers of a kind known per se. In an embodiment of the apparatus in which the chamber is provided with a carrier means arranged to move the chamber relative to the supporting structure, the carrier means may be, for example, one or more driving wheels arranged to be in engagement with the supporting structure. In such an embodiment, at least one of the supporting structure and the chamber has a driving means arranged for it, to provide a relative movement between the constructional element and the chamber.

The apparatus may comprise two or more fluid-jetting devices. The fluid-jetting devices may typically comprise nozzles of a kind known per se. When two or more fluid-jetting devices are used, which are typically arranged in series, they may, for example, be adjusted in such a way that they each have an effective range of action against a respective portion of the insulation material. When using three fluid-jetting devices, for example, a nozzle in the first fluid-jetting device may be adjusted to have an effective range of action against an upper portion of the insulation material, accordingly against the portion that is nearest to the fluid-jetting devices, a nozzle in a second fluid-jetting device may be adjusted to have an effective range of action against a middle portion of the insulation material, whereas a nozzle in the third fluid-jetting device may be adjusted to have an effective range of action in a lower portion of the insulation material, against the portion that is nearest to the supporting structure then.

When more than said three fluid-jetting devices are used, the adjustment may be "finer" than said upper, middle and lower portions; possibly, two or more fluid-jetting devices have the same effective range of action.

A person skilled in the art will know that a constructional element of the kind in question here may be provided with a cut-out such as, but not limited to, a window, a door or a channel. Such a cut-out may represent an obstruction to a fluid jet. An insulation material positioned on the "leeward side" of a fluid jet thus will not be separable from the constructional element without the above-mentioned complicating two-step cleaning process. In order to be able, in a simple manner, to ensure a full separation of the insulation material from the constructional element, it is therefore an advantage if at least two of the fluid-jetting devices have substantially mutually opposite jetting directions. That is to say, at least one fluid-jetting device has a jetting direction from a bottom side of the supporting structure. When using several fluid-jetting devices with said jetting direction, they may be adjusted with different effective ranges of action as mentioned above.

Independently of whether the fluid-jetting devices have jetting directions towards or away from the supporting structure, it is an advantage if they can be adjusted by means of a control unit of a kind known per se. Such a control unit may also be configured to control the amount of fluid and/or the fluid pressure of each of the at least one fluid-jetting device.

The fluid that is used in the apparatus to detach the insulation material from the constructional element may be a gas such as air, a liquid such as water, or a combination of a gas and a liquid. Additionally, the fluid may contain solid particles such as sand or some other means of providing an abrasive fluid to facilitate separation of the insulation material from the constructional element. An abrasive fluid has turned out to be particularly effective against an insulation material of the XPS and polyurethane types, but may of course also be used against an insulation material of the EPS type.

The apparatus may be provided with a means of collecting at least the insulation material that has been separated from the constructional element, so that the released insulation material and the constructional element can be removed separately from the apparatus.

In one embodiment, the apparatus may comprise a vessel which is arranged to be filled with liquid, the vessel being arranged to receive the constructional element while the releasing of the insulation material is in progress. A vessel like that may be of such a size that the constructional element may be completely submerged. Said means of collecting the insulation material may then comprise the vessel, and possibly a collecting device, for example a so-called "skimmer", to collect the released insulation material floating in the liquid. When a vessel like that is used, the at least one fluid-jetting device of the apparatus may be movably arranged relative to the vessel. Such an apparatus may, but does not have to, comprise a chamber of the kind described above.

In a second aspect of the present invention, there is provided a method for separating an insulation material from a constructional element to which the insulation material is attached, by using the apparatus according to the first aspect of the invention, the method comprising the steps:
  bringing at least a portion of the concrete-based constructional element with the plastic-based insulation material into a chamber of the apparatus, the chamber comprising at least one fluid-jetting device;
  generating relative motion between the apparatus and the constructional element and bringing fluid under pressure against the insulation material so that the insulation material is released from the constructional element; and
  removing the released insulation material and constructional element separately from the apparatus.

The relative motion between the apparatus and the constructional element may be in one direction, or a reciprocating motion. By such a reciprocating motion, the at least one fluid-jetting device may be adjusted at each reversal of moving direction. For example, at a first forward movement of the constructional element, the fluid-jetting device may be adjusted to have an effective range of action against an upper portion of the insulation material. At a subsequent return movement, the fluid-jetting device may be adjusted to have an effective range of action against a middle portion of the insulation material, and, at a second forward movement, be adjusted to have an effective range of action against a lower portion of the insulation material.

When at least two fluid-jetting devices are used, two of the fluid-jetting devices may be arranged with substantially mutually opposite jetting directions so that the above-mentioned challenges related to possible cut-outs in the constructional element are overcome. An arrangement like that requires the constructional element to be carried by a supporting structure which is raised above the ground so that a fluid-jetting device may be moved in between the ground and a bottom side of the constructional element.

To provide said different ranges of action of the at least one fluid-jetting device, the fluid-jetting device may be arranged to be adjustable with respect to spread angle and/or jetting direction. It is an advantage if the adjustment is provided by means of a control unit of a kind known per se.

The invention is defined by the independent claims. The dependent claims define advantageous embodiments of the invention.

BRIEF DESCRIPTION OF THE DRAWINGS

In what follows, an example of a preferred embodiment is described, which is visualized in the accompanying drawings, in which.

DETAILED DESCRIPTION OF THE DRAWINGS

Figure 1:
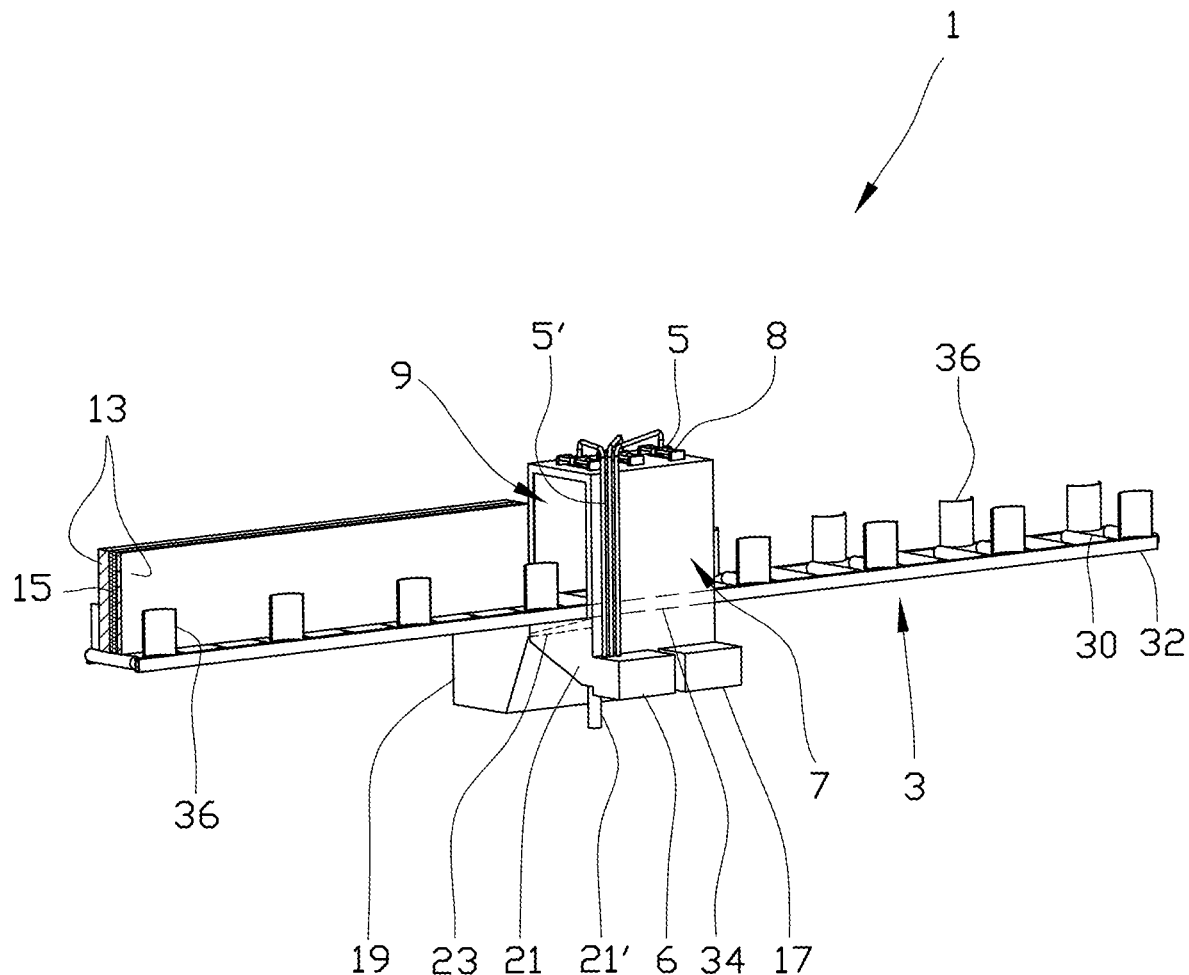
FIG. 1 shows a view in perspective of an apparatus according to the present invention, in which a constructional element is placed on a supporting structure.

Positional indications such as "right", "left", "upper", "lower", "bottom side" and "top side" refer to the positions appearing from the figures.

The relative proportions of individual elements shown in the figures may be somewhat distorted.

In some of the figures, some of the elements may be shown without reference numerals.

In the figures, the reference numeral 1 indicates an apparatus according to the present invention. In the embodiment shown, the apparatus 1 comprises a supporting structure 3, shown here as a roller conveyor 3.

Figure 2A:
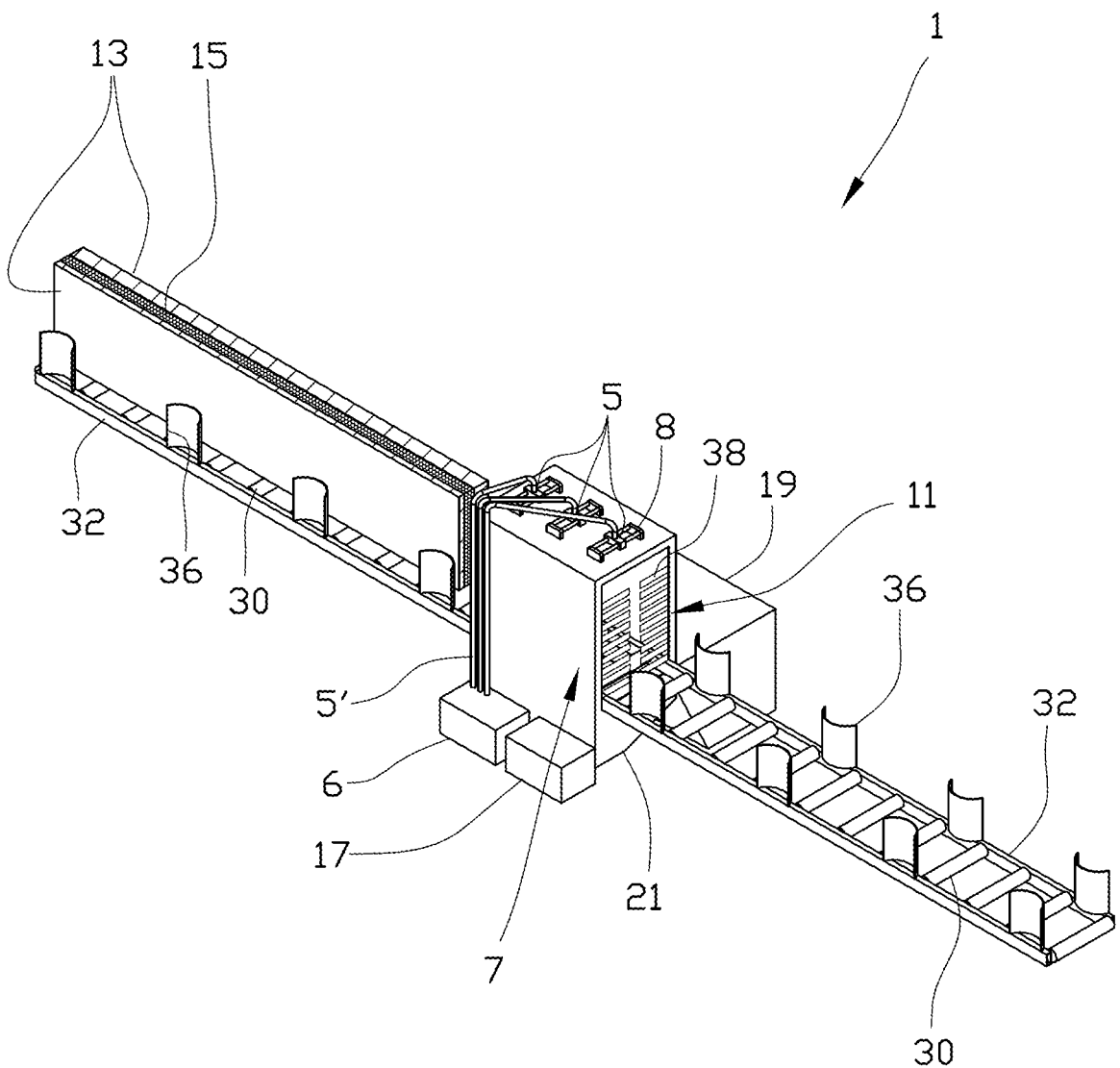
FIG. 2a shows the apparatus of FIG. 1, but viewed from a different angle.
Figure 2B:
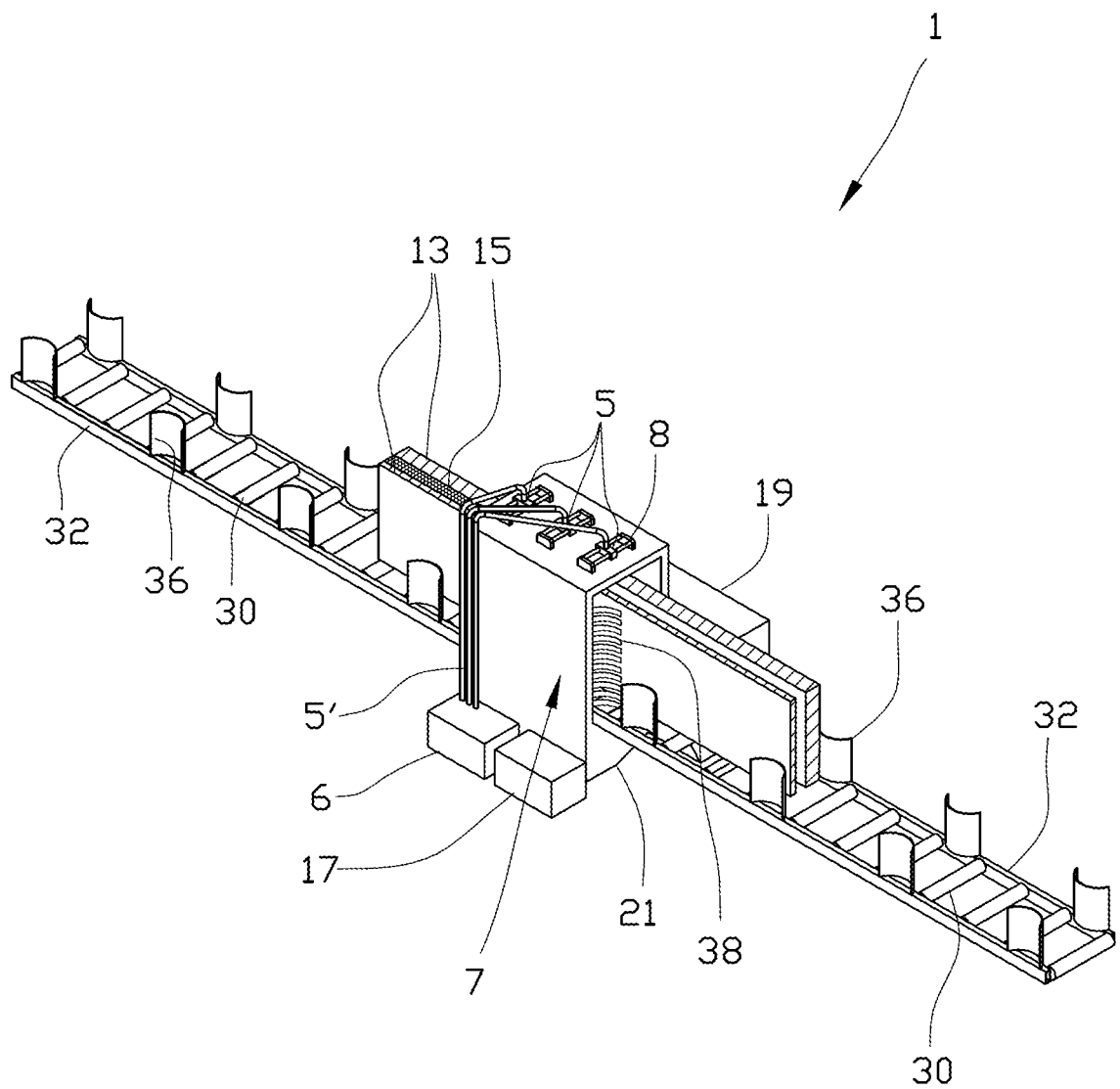
FIG. 2b shows the apparatus of FIG. 2a, but the constructional element has been partially cleaned of insulation material.
Figure 3A:
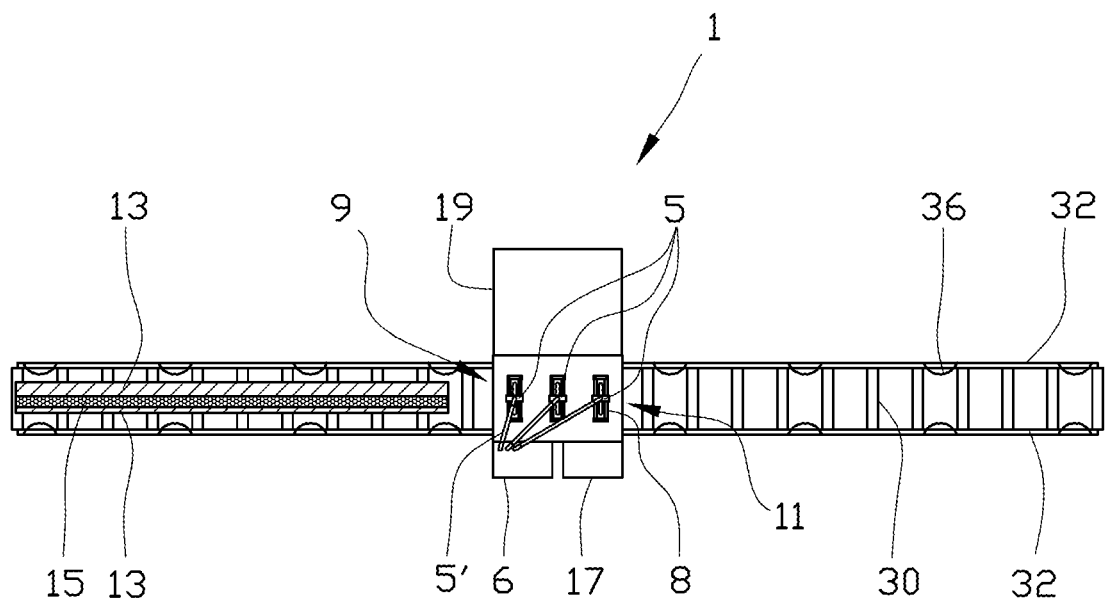
FIG. 3a shows the apparatus of FIG. 1, viewed from above.
Figure 3B:
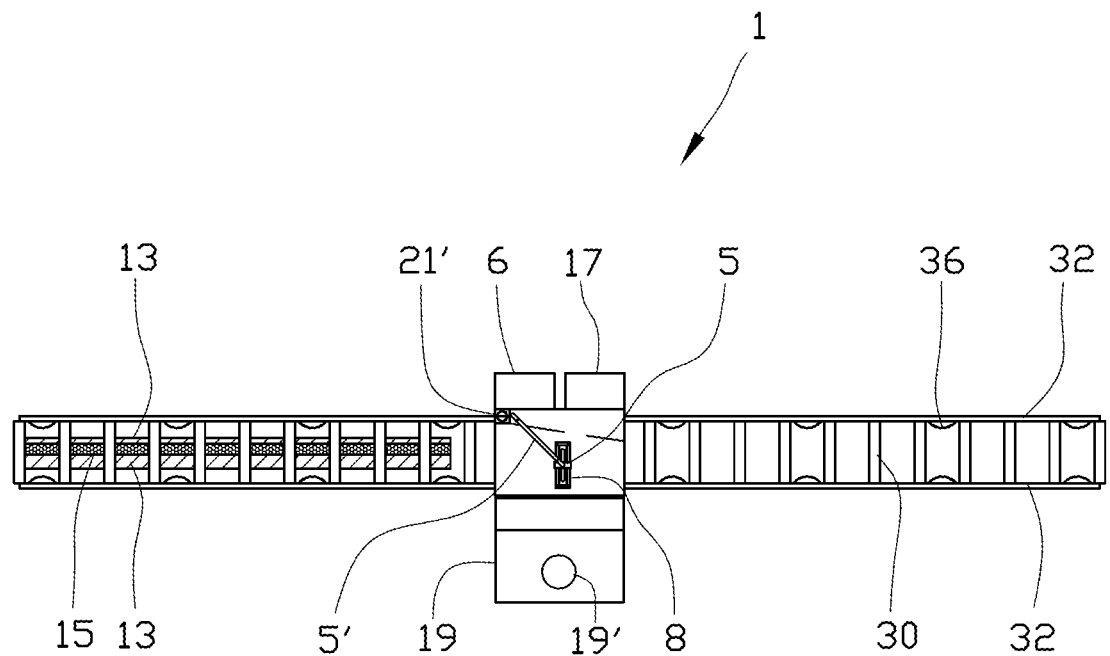
FIG. 3b shows the apparatus of FIG. 1, viewed from a bottom side.

The apparatus 1 comprises a plurality of fluid-jetting devices 5 (a total of four shown; three in FIGS. 1, 2a, 2b and 3a; one shown in FIG. 3b). In what follows, the fluid-jetting devices 5 will also be referred to as jet nozzles 5 or just nozzles 5. Each jet nozzle 5 is in fluid communication, by means of fluid lines 5', with a pressure-generating device 6 which is configured to produce a fluid pressure sufficient to accomplish the object of the present invention. The pressure-generating device 6 will also be referred to, in what follows, as an HPU (High Pressure Unit) which is a term commonly used in the trade. The HPU 6 is in fluid communication with a fluid source, not shown.

The jet nozzles 5 are arranged for a chamber 7 which has an entrance portion 9 and an exit portion 11. The chamber 7 is configured to enclose a portion of a concrete-based constructional element 13 which is provided with a plastic-based insulation material 15. In the figures, the constructional element 13 and the insulation material 15 are shown as a sandwich structure 13, 15 in which the insulation material 15 is placed between two constructional elements 13.

The jet nozzles 5 are displaceably arranged on nozzle carriers 8 so that the nozzles can be displaced transversely to a longitudinal axis of the supporting structure 3, sideways between the constructional elements 13, that is. Such a displacement is especially used in cases in which the insulation material is relatively thick, for example in the order of 20-35 cm. In a case like that, a displacement of the nozzles 5 will typically take place at a reversal of direction in connection with reciprocating motion as discussed above.

The supporting structure or roller conveyor 3 is provided with a plurality of rollers 30 which are rotatably attached to two cheeks 32. The rollers facilitate a movement of the sandwich structure 13, 15 along the roller conveyor 3 so that the sandwich structure 13, 15 may be carried through the chamber 7. At least one of the rollers 30, but preferably two or more, may be provided with a driving means in the form of a motor arranged to produce rotation of the roller(s). Such a driving device will be well known to a person skilled in the art and is therefore not shown. With the solution described here, the sandwich structure 13, 15 can thus be moved relative to the chamber 7.

Alternatively, or in addition, to moving the sandwich structure 13, 15 relative to the chamber 7, the chamber 7 may be moved relative to the supporting structure 3. Such a movement may be provided by means of a carrier means 34 (indicated in broken lines in FIG. 1) arranged in internal side portions of the chamber 7 and slidably attached to the cheeks 32 of the supporting structure 3. By providing the chamber 7 with a rotating driving means which is in engagement with the cheeks 32 of the supporting structure 3, the chamber 7 may be moved relative to the supporting structure 3. An example of a rotating driving means is a rubber roller which is set into rotation by a motor. Another example of a rotating driving means is a toothed wheel which is set into rotation by a motor, the toothed wheel being in engagement with a complementary element such as a pitch rack (not shown), for example, attached along at least one of the cheeks 32.

In the embodiment shown, the apparatus 1 is further provided with a control unit 17 which communicates with the HPU 6 and the motor(s), not shown, for the rollers of the supporting structure 3 and/or for the rubber roller or toothed wheel of the chamber. Such a control unit can be made by a person skilled in the art and is thus not described any further in this document.

As shown best in FIG. 1, the apparatus 1 comprises a means 19 arranged to collect at least the insulation material 15 that is detached from the constructional element 13 when the sandwich structure 13, 15 is carried through the chamber 7 and subjected to fluid jets. The means 19 is shown in FIG. 1 as a receptacle 19. The receptacle 19, also referred to as the insulation receptacle 19 in what follows, is connected to a fluid receptacle 21 arranged to receive fluid in the form of a liquid, typically water, that is jetted from the nozzles 5 into the chamber 7. The fluid receptacle 21 is arranged just below the supporting structure 3, whereas the insulation receptacle 19 is arranged below and to one side of the supporting structure 3 as shown best in FIGS. 2a and 3a. Fluid from the nozzles 5 will be carried together with released insulation material 15 towards the fluid receptacle 21.

A slanted filter element 23 is placed in a top portion of the fluid receptacle 21. The filter element 23 has a mesh size adapted for retaining released insulation material 15 and directing it on to a top portion of the insulation receptacle 19.

A drain 21' is arranged in a lower portion of the fluid receptacle 21 to allow draining thereof. The drain 21' may be in fluid communication with the fluid source, not shown, or with the HPU 6, so that the fluid, typically water, is recycled.

The insulation receptacle 19 is provided with a connecting device 19' (indicated in FIG. 3b) for the insulation receptacle 19 to be connectable to an external receiving device (not shown) for released insulation material 15. In its simplest form, the receiving device may be a so-called big bag, but may alternatively be a container. Such a container may include a suction device which produces a negative pressure in said external container and thereby in the insulation receptacle 19 as well. Released insulation material 15 may thereby be sucked out of the insulation receptacle 19 either continuously or whenever required.

In FIGS. 1, 2a, 3a and 3b, the sandwich structure 13, 15 is shown placed on the supporting structure 3, but before it has been carried into the chamber 7 with nozzles 5, that is to say before the insulation material 15 has been separated from the constructional element 13.

FIG. 2b shows the sandwich structure 13, 15 while it is being carried through the chamber 7. The part of the sandwich structure 13, 15 that is upstream of the chamber 7, accordingly to the left of the entrance portion 9 of the chamber 7, is "intact", whereas the part that is near the exit portion 11 of the chamber 7 and downstream, accordingly to the right of the exit portion, has been freed of insulation material 15 and thus comprises only the constructional element 13. The two portions of the constructional element 13 are kept spaced apart by means of embedded spacers or so-called "struts" (not shown) which will be well known to a person skilled in the art.

To ensure correct alignment of the sandwich structure 13, 15 and the constructional element 13 on the roller conveyor 3, and at the same time reduce the risk of it tilting sideways, the roller conveyor 3 is provided with supporting elements or guides 36 arranged in a spaced-apart manner along the roller conveyor 3. In the embodiment shown, the guides 36 are attached to a top portion of the cheeks 32. In one embodiment, the guides 36 are provided with adjustable attachment means (not shown) of a kind known per se, to allow a displacement of the guides in a direction perpendicular to a longitudinal direction of the roller conveyor 3. The spacing of opposite guides 36 may thereby be adjusted to the thickness of the sandwich structure 13, 15 which is the distance between the external side faces of the constructional element 13.

In FIGS. 2a and 2b, the exit portion 11 of the chamber 7 is provided with a number of elastic fingers 38. The purpose of the fingers 38 is to provide a flexible gate in the chamber 7 so that fluid from the nozzles 5, solid particles, if any in the fluid, and released insulation material 15 will, to the smallest possible extent, flow out through the exit portion 11 of the chamber. Even though it is not shown in the figures, corresponding elastic fingers may, with advantage, be placed in the entrance portion 9 of the chamber 7 as well. In a prototype of the apparatus 1, the elastic fingers are made of a rubber material.

Figure 3C:
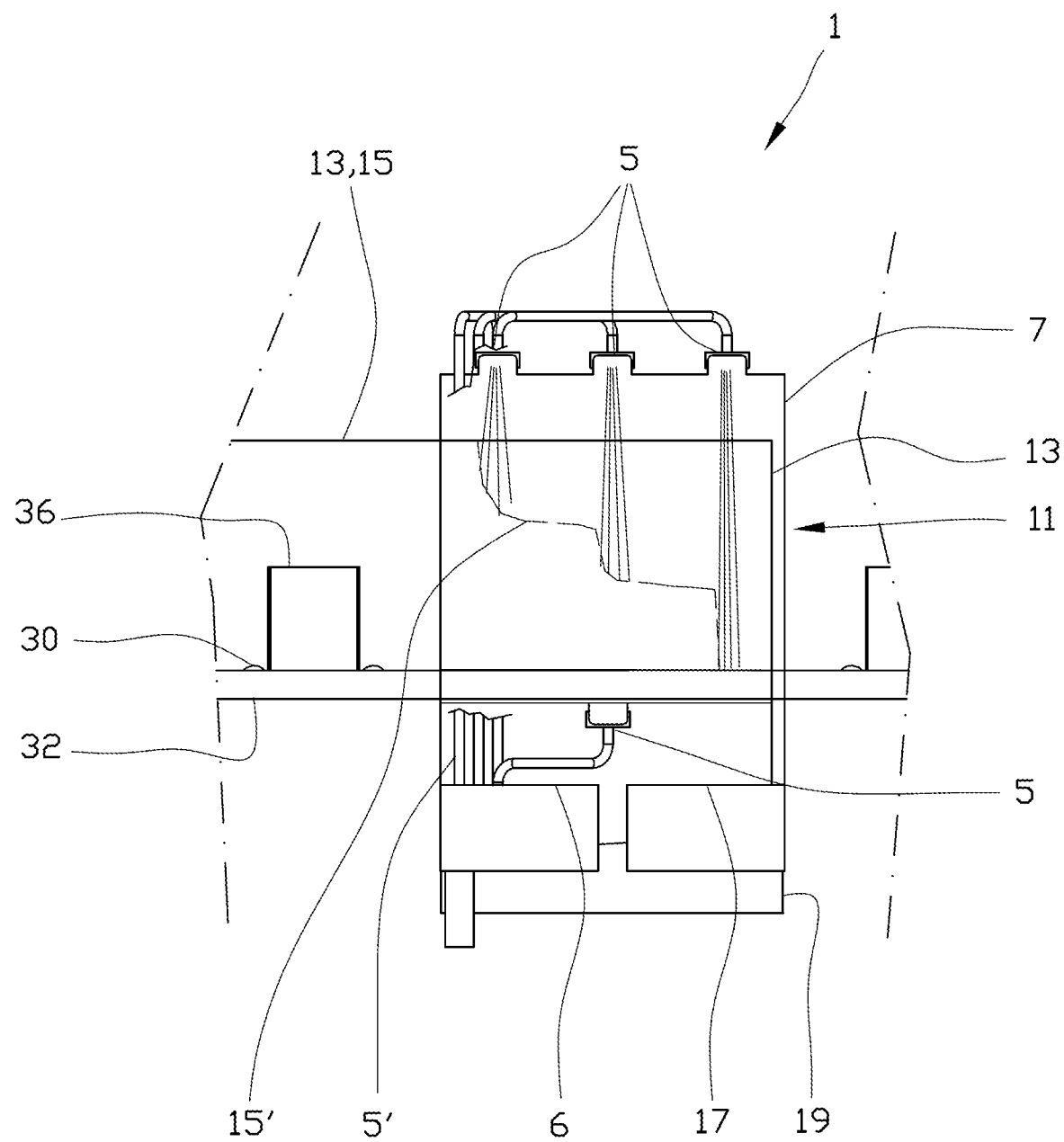
FIG. 3c shows a detail of a portion of the apparatus in a side view on a larger scale.

FIG. 3c shows a principle drawing, on a larger scale, of the chamber 7 (shown transparently), in which the nozzles 5 have been adjusted to have different effective ranges of action. For the sake of clarity, a portion of the fluid lines 5' extending between the HPU 6 and the nozzles 5 are not shown. The upper left-hand nozzle 5, which the sandwich structure 13, 15 meets first when being carried in through the entrance portion 9 of the chamber 7, has an effective range of action against an upper portion of the insulation material 15. The upper middle nozzle 5 has an effective range of action against a middle portion of the insulation material 15, whereas the upper right-hand nozzle 5 has an effective range of action against a lower portion of the insulation material 15.

As the sandwich structure 13, 15 is being carried through the chamber 7, the fluid jets from the nozzles 5 will release the insulation material 15 from the constructional element 13. A border face 15' will form between non-released and released insulation material 15. Below and to the left of the insulation border face 15', the insulation material 15 is intact, whereas the insulation material has been removed to the right and above the insulation border face 15'.

In the embodiment shown, the lower nozzle, shown in FIG. 3b, has not been activated, as the sandwich structure 13, 15 shown does not have any cut-out that will represent an obstruction to the upper nozzles. The lower nozzle 5 may for example have an effective range of action against a middle portion of the insulation material 15, as the purpose of the lower nozzle is primarily to ensure release of any insulation material 15 present on the "leeward side" of a possible cut-out as discussed earlier. It should be underlined that the chamber 7 may be provided with a different number of nozzles 5 from that shown, both in the upper portion and in the lower portion of the chamber 7.

From the description above it will be understood that the apparatus 1 according to the present invention provides an apparatus 1 which may be used efficiently and reliably to arrange for recycling of insulated constructional elements.

The apparatus 1 is particularly effective for constructional elements of the sandwich type 13, 15 in which access to the insulation material 15 is only through the edge faces of the constructional element. The nozzles 5 of the apparatus 1 release the insulation material 15 from the constructional element 13 without the integrity of the constructional element 13 being deteriorated. This is because the struts of the constructional element 13 are not cut by the fluid jet(s). Any risk of injury to personnel in consequence of uncontrolled separation of the two constructional elements 13 of the sandwich structure 13, 15 will thereby be practically eliminated.

It should be noted that all the above-mentioned embodiments illustrate the invention, but do not limit it, and persons skilled in the art may construct many alternative embodiments without departing from the scope of the attached claims. In the claims, reference numbers in parentheses are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A method of separating a plastic-based insulation material from a concrete-based constructional element to which the insulation material is attached, the method comprising:
   providing an apparatus for separating the insulation material from the constructional element to which the insulation material is attached, the apparatus comprising at least one fluid jetting device which is in fluid communication with a pressure-generating device to produce a fluid jet with a pressure sufficient to release the insulation material from the constructional element; motion means for providing relative motion between the at least one fluid-jetting device and the constructional element, wherein the at least one fluid-jetting device is connected to a chamber arranged to at least partially enclose a portion of the constructional element, and wherein a jetting direction of the at least one fluid-jetting device is directed inwards in the chamber;
   bringing at least the portion of the constructional element with the insulation material into the chamber comprising the at least one fluid-jetting device;
   generating a relative movement between the apparatus and the constructional element via the motion means and bringing fluid under pressure from the at least one fluid-jetting device against the insulation material so that the insulation material is released from the constructional element; and
   collecting the released insulation material by a collecting means connected to the chamber, and bringing the constructional element out of the chamber separately from the released insulation material.

2. The method according to claim 1, wherein at least one of a spread angle and a jetting direction of the at least one fluid-jetting device is arranged to be adjustable.

3. The method according to claim 1, wherein the method further comprises providing the apparatus with a supporting structure for carrying the constructional element while the at least one fluid-jetting device is directed against the insulation material.

4. The method according to claim 3, wherein bringing at least the portion of the constructional element with the insulation material into the chamber comprises moving the chamber relative to the supporting structure.

5. The method according to claim 3, wherein the supporting structure includes a plurality of rollers, wherein rotation of at least one of the plurality of rollers is driven by a motor.

6. The method according to claim 5, wherein bringing at least the portion of the constructional element with the insulation material into the chamber comprises rotating at least one of the plurality of rollers to drive the constructional element with the insulation material into the chamber.

7. The method according to claim 1, wherein the at least one fluid-jetting device comprises at least two fluid-jetting devices.

8. The method according to claim 7, wherein the method further comprises arranging the at least two fluid-jetting devices to have substantially mutually opposite jetting directions.

9. The method according to claim 1, wherein the fluid under pressure is selected from a group consisting of: a gas, a liquid, and a combination thereof, with or without solid particles.

* * * * *